ced May 8, 1945

UNITED STATES PATENT OFFICE 2,375,259

HYDROSOL OF IRISH MOSS AND THE METHOD OF PREPARING THE SAME

Gordon Webster Stoyle, Wollaston, Mass.

No Drawing. Application August 2, 1940,
Serial No. 350,095

5 Claims. (Cl. 252—303)

This invention relates to a hydrosol of Irish moss and the process for preparing the same.

Irish moss, also called carrageen (*Chondrus crispus*), being a marine vegetable growth found on rocks near the lower limits of tidal flow, is the important starting point for the manufacture of a colloidal substance which I believe to be new, which I have discovered and have found to possess high utility in various industrial arts.

This substance is a liquid which will combine with other liquids to act as a wetting agent, an emulsifying agent, a binder, a penetrator. It will serve for holding in suspension chemical solutions, both organic and inorganic, with oils and water, for extended periods. And it has other properties of allied nature, and acts to reduce interfacial tension.

The substance provided by the invention is usable as a mixing liquid or carrier in various kinds of inks, as printing and lithographing inks, with the effect to increase their coverage, and their rapidity of drying, and to produce a better color tone. It also is usable as a base or vehicle in dyes, in various percentages, with either water, oil, or spirits. In chemical compound dyes it acts as a dispersing agent for dye-particles. For the dyes in ink, rubber, paint, and in liquids for treating all manner of textiles, it aids suspension with the effect first, of increasing the stability of the dispersion, and, second, of increasing durability, flexibility, resiliency and tensile strength of the textile.

A feature of especial interest is that it combines with advantage in various adaptations of rubber, especially latex, with the effect of giving body bulk to the rubber compounds; and of giving, to rubber liquid, improved penetration into material, whether the rubber be natural or synthetic or in solution, resulting in improved coverage.

Among other features it is noted that products in whose making my moss liquid has been used, have increase of tensile strength over what they would have if prepared without it, as hitherto customary.

Owing to its special characteristic of affinity for creating a self-sustaining body binder, this colloidal product of the marine flora will assist as a fast emulsifier, to wed the component parts of any liquid into miscibility. When applied for compounding heavy chemical salts or minerals for industrial use, it will assist in holding such in suspension, as white lead, mica, sulfur, asbestos, magnesium; and for the flotation of oxides, sulfates and salts of tin and zinc and their derivatives, and other chemical substances.

In the ultimate products, in which the primary product above mentioned is incorporated, there is observed a marked improvement in rapidity of drying, by oxidation and otherwise. This makes a considerable saving in time, which is of value to the manufacturer of natural glues, caseins, compounded resins and the like, and to makers of synthetic adhesives, cloths, paper and other sheets. As applied with rubber latex the primary product greatly increases the penetrating ability of the rubber, so that rubber latex solutions can be used in a percentage range of 2% to practically 100%. In the lower percentage scale the latex has the double effect of acting as a plasticizer for the material and also of penetrating directly so as to coat fibres in the structural tissues to which it is applied. In the case of bulk compounds of rubber the moss products will act as a filler and also as a binder. For illustration, from a mixture having 25% rubber latex (of 38–40% rubber), 25% water and 50% of the moss colloid of the invention there can be formed a rubber film having thickness in the range from a 64th of an inch upward to an eighth of an inch, which is self-casting, drying at a temperature of 70° F. in some fifteen hours without aid of chemical catalysis.

As applied to solutions for and including the various dyes, it makes possible a great saving in the proportion of dye required to gain a particular effect because the dye particles are so perfectly dispersed and suspended. In rubber solutions containing the moss colloid a similar effort is observed.

The resulting improvements in operative procedure enable the manufacturers of various industrial products to eliminate one to three intermediate or auxiliary processes hitherto commonly used, because of the ability of the moss colloid to coact with dye-particles, rubber latex particles, or other; and because of the rapidity of its penetration; and because of the speed of its drying, in cases of oxidation.

The perfecting of the moss colloid of the invention, and of the means for making it in form to attain the above-mentioned results, involves the process of developing the colloidal body from the marine flora in such manner that it will stand without deterioration. This also requires the eliminating of structural fibre, harmful bacteria, sand, and other elements which would disturb either its preservation or its utility.

The source material, Irish moss, found in abundance in several botanical varieties in certain regions, is to be carefully distinguished from seaweeds of the genus Laminaria, known at Kelp, a marine growth found in several varieties in the same regions. This is because of the algin and alginic acid characteristics of the kelp.

The process of manufacture of the colloid of the invention is arranged to utilize as raw material the proteins, chlorophyls and the general protoplasmic structure of the Irish moss. The avoidance of kelp and its derivatives as ingredients is particularly important where it is intended to combine the moss colloid of the invention with a rubber latex ingredient to make ultimately an elastic product. My experiments have shown that, if kelp products be present, the ultimate product must have a higher percentage of rubber; and that if such a product containing a kelp derivative be subjected to tensile elongation there will be a marked striated reaction, showing that the real rubber in the product has broken down. I believe this to be because the reaction of the alginic acid, or salt, of the kelp has damaged the rubber structure. But in the case of my Irish moss colloid the basic proteins and dextrines of natural latex can safely be intermixed with a very high ratio of the moss colloid as, for example, 15% of latex, 50% of Irish moss colloid and 25% of water. I have found that the film of such a combination will undergo the stress of tensile elongation with a very small percentage of striation, showing very little breakdown. And the elongation can be far greater, and yet reclaim itself, in contrast to the results with kelp which show a marked striated effect and little or no natural reclaim.

This indicates that the Irish moss colloid can rebuild itself as rubber can, and this would explain its complete miscibility, and its ability to overcome the fatigue which is damaging to rubber compounds when other material is used as filler. With larger percentages of the Irish moss colloid, material supplied by the colloid reinforces that of the rubber and homogeneously makes a marked showing like the characteristics of real rubber. It also provides a means for controlling the behavior of films of rubber latex.

The process of the invention for making the colloid is to be distinguished from processes such as have heretofore been used in preparing Irish moss for use as food jelly and for gels for industrial use. Hithereto the Irish moss has been boiled for periods of two to four-hours, the product being one which on cooling becomes a gelatinous mass widely used for its gel effect. The finished colloid of my invention will not gel, and is not at all comparable to the gelatine, jelly, etc., hitherto known as a product of Irish moss. The boiling step in its preparation is relatively short, and not sufficient to produce the gel. When cool it remains a liquid, having a viscosity somewhat under that of molasses. In some ways its consistency resembles that of glue or mucilage, being of a tough albuminous character. It is capable of being sustained by a very low percentage of preservative.

The viscosity of the moss colloid can be controlled in either direction, either to thin it or to thicken it. The viscosity can be reduced without destroying its workability; or it can be sensitized to form any manner of control, either in cases of high viscosity or solidified gels, without the application of heat or mechanical agitation, and without changing its chemical composition or structural features.

The hydrogen ion concentration, or pH value, of my moss colloid is within the safe limit for compounding with rubber, and especially rubber latex.

Among the important objects and results of the invention are the finding of a liquid having the industrial utility above indicated; the providing of a practicable process by which it can be made under industrial conditions; and the preparing of the liquid so that it can easily and securely be preserved from deterioration for sufficiently long periods to be conveniently usable under industrial conditions without burdensome waste.

For the process of manufacture, the Irish moss, procured from sea rocks as hitherto customary or otherwise, contains 80% or so of water. It may be dried as hitherto in bulk on the beach, after which it is by any suitable means to be cleaned of its sand, dirt and small percentage of lipoids, as by being placed in a cylindrical wire mesh container and agitated there in a cold water wash. It then is to be heated and boiled in fresh water, which may be done on the basis of two pounds of the dried and washed moss to not less than six gallons of fresh water, a ratio of seven gallons being preferable. For the boiling step it may be held in a wire mesh cylinder of about window-screening coarseness, and be agitated continuously or at intervals during an application of heat lasting only about a half hour or at any rate not more than about an hour, in fifteen minutes of which the water is boiling and in about half of which the temperature is just under the boiling point. This step loosens material for the colloid from the gummy resin which is binding it structurally in the natural moss.

If the heating be continued too long or if the ratio be greater than two pounds of the moss to six gallons of water the formation of a thick glutinous material occurs, which is to be avoided, as this results in a product which forms a gel which is not soluble in water added later. After this boiling, or equivalent by steam, the liquid may be let down to a temperature of the vicinity of 150° F. and be centrifuged in suitable apparatus, for which an industrial clarifier may be used, or apparatus of the type of a cream separator. This removes sand and about two-thirds of the structural fibre, which has been released and separated by the boiling. The resulting liquid which is predominantly protein and protoplasm, being about three-quarters of each original six gallons, is then made to stand in quiet two days or so with the greater part of its body above a porous partition consisting of a fine screen of copper, for which 500 mesh is suitable. A settling follows, of fine and microscopic matter which goes through the screen, and of remaining fibre, which accumulates on the porous partition in a sort of film and helps prevent any return of the very fine matter that has gone below it. Then the liquid can be decanted, down to a level a little above the porous partition, preferably by a spigot set at a proper level. The straining can be effected by other means, as by pressure filtration if desired.

The result is a liquid, having a consistency comparable to that of molasses, which, after being thus clarified and having a suitable preservative incorporated in it, is free from danger of germination of spores that might remain in the microscopic residues of fibres, and from other residual matter of initial natural ingredients. If the colloid thus made is to be used for food purposes, all vessels used should have an inert lining, as of porcelain or stainless steel. When the colloid is to be used for food or for cosmetics it is advisable to introduce alcohol or glycerine, in place of the preservative indicated above both for the preservation of the composition, and in some cases for the individual effect of the alcohol, or of the glycerine as, e. g., alcohol to expedite drying; or, in cosmetics, glycerine as a thickening or sizing agent or to accelerate absorption through the skin.

The alcohol may be in the range of 3% to 9%, and the glycerine of 5% to 12%.

Without preservative the moss colloid prepared as above will keep and be good for use about four days. When suitably treated with preservative, as with the composite, or the alcohol, or the glycerine, indicated herein, it will keep in usable condition for years.

For ordinary industrial uses the following is an illustration of steps which may be taken, which I have found satisfactory for processing the colloidal formation for permanent preservation: On a gallon formation, a mixture of salts, as follows:

|  | Grains |
|---|---|
| Benzoate of soda | 40 |
| Ammonium carbonate | 40 |
| Aluminum acetate | 10 |
| Copper sulphate | 5 |
| Sodium tungstate | 2 |
| Tannic acid (powder) | 1.5 |
| Extract of oxgall | 1.5 |
|  | 100.0 | may be put into a mixture of:

|  | Ounces |
|---|---|
| Water | 87 |
| Irish moss liquid | 36 | in which there is:

|  | Ounces |
|---|---|
| Acetone (pure) | 1.5 |
| Formaldehyde (40%) | 1.5 |
| Milk, cow's, skimmed | 1.5 |
| Cellosolve acetate | .5 |
|  | 128.0 | being about 1 gallon. The mixing may be done in atmosphere, with heating, and with agitation by rotating propeller.

The colloid concentrate thus made has all around merit for numerous manufacturing fields. For any special field, some of the foregoing ingredients which are put in, to fit it for other special fields, may be omitted, if not needed.

Thus the benzoate of soda, ammonium carbonate, acetone and formaldehyde are preservatives, for use if the product is to stand beyond four to seven days before use.

The aluminum acetate, copper sulphate, sodium tungstate and tannic acid are hydrolizing agents valuable when the product is to be used in dye.

The oxgall is a setting agent for dye, not always needed. However, as the minimum customary for setting agents used in prior art is 5%–15% acetic acid, the oxgall is advantageous if such an agent is wanted.

The acetone is a sensitizer; and also is useful for synthetic casein effects, with the milk and the cellosolve acetate, for making the moss colloid have affinity for cellulosic material, as in cloth, paper, rayon, celanese, and on proteins as wool and leather.

Where higher viscosity is desired a smaller percentage of water may be used; or for less viscosity there may be more water used.

To this basic colloid there will ordinarily be added one or more substances of the class of alcohols, or of oils, gums, and resins, solvents, or rubber, according to the use to which the colloidal mixture is to be put, for making whatever ultimate product is in prospect—these added elements being generally in a quantitative relation of 1 to 4 ounces per gallon.

The finished moss colloid is now balanced; and it has in general the power to add, to the industrial products in which it is to be used, that special quality which is the reason for desiring to use it. For illustrations:

In the ratio of one ounce to a pound of printing ink, this moss colloid will afford once to twice the amount of coverage, or mileage, which could be had from the original pound.

In the treating of textiles, the increase will saturate from one to three running yards more.

The effect of a given amount of dye will be extended further than heretofore.

In many applications of rubber latex, the addition of the colloid furthers the rubber effect, permitting the attaining of a given result with less of the rubber.

And in many other individual fields of manufacture, the incorporation of the moss colloid with the substance, which is being applied according to the conventions practiced hitherto, will give a new characteristic—changing the feeling, the texture, the finish, the flexibility, the resilience, or whatever quality is being developed.

As to light fastness, I have found that in dyes, throughout a wide range from fugitive dyes to fast dyes, the moss colloid will increase the light fastness under test conditions by a measure of from 2 to 125 hours, depending on the combination of colors and the general material used.

In foods, the moss colloid can be compounded with gelatin, syrup, and the like.

It can be a vehicle to carry drugs, etc.; and can act as a filler in cosmetics and other products. In mixtures it can be a plasticizer and a stabilizer to promote better stability of the manufactured product.

The moss colloid concentrate is normally a liquid of light, milky, straw color, having a faint wood odor. It is soluble in cold water and in hot; and it is self-emulsifying. It is 50% miscible with alcohol with agitation; with glycerine it is completely miscible in all percentages. With mineral oils I have found it only somewhat soluble; but this field is open to research. With vegetable oils it is more readily soluble and miscible, especially with high speed agitation; and this can be improved by special agents according to the particular application desired. The weight of a gallon of the moss colloid I have found to range from 8.56 to 8.87 pounds, the solid contents being only 4.5%.

Specific gravity of the concentrated moss colloid has been found to be 1.004; and pH value 6.9. The viscosity can be controlled by the percentage of water present, and so for example made thinner, for treating wool textiles and thicker for treating cotton.

When a mixture of the moss colloid with 1% to 2% of rubber is impregnated into textile fabrics for automobiles the mixture has been found not to break down with boiling or with freezing; the cloth has stood fast in color far beyond previous experience, and the quality and feel of the fabric is much improved over what they were before the impregnation. The rubber has made them firmer, and probably stronger to resist wear; because the moss colloid has carried the rubber in with thorough penetration. Such an application can be made with high pressure between rolls.

For use on cloths and papers it is necessary to balance the water, that is, to hold it in a state of miscibility, in the general formula, to avoid the possibility of rubber forming a skin coating on. instead of saturating, the material.

In cases where the use is for coatings applied with a doctor-knife, added alcohol, Rochelle salt and amyl-acetate will act as sensitizers to form a gelatinous mass (gelatin-synthetic casein) for plasticizing coatings, which causes quicker drying, by rapid oxidation.

In the initial preparation the Irish moss can be that which has been cured by nature, after being washed and spread and dried by the sun, or it can be cured chemically. The latter softens the moss and frees it of certain material that might be harmful to health if eaten, but the general process is the same. The dried moss may be pulverized, as in a pebble mill, and then enclosed in a cloth or screen within the heated or boiling water. This relieves the clarifier from becoming so quickly loaded with particles of fibres. Other methods of performing the preliminary cleaning and purifying operations, and for the clarifying can be employed.

The preservatives above mentioned can be omitted if the moss colloid is to be used in combination with some product which would act as a preservative or have preservative ingredient.

I claim as my invention:

1. A process for making a hydrosol of Irish moss comprising the mixing of Irish moss in a body of water having at least twenty-five times the weight of the dry moss, and holding that body for a quarter hour at the temperature of boiling water and also for a quarter hour at a temperature which is within a range less than that of boiling but not less than 150° F., identified in that the optimum within this range is at the verge of ebullition; the total duration of said temperatures not exceeding one hour; followed by centrifuging.

2. A process for making a hydrosol of Irish moss comprising the mixing of Irish moss in a body of water having at least twenty-five times the weight of the dry moss, and holding that body for a quarter hour at the temperature of boiling water and also for a quarter hour at a temperature which is within the range of 175° F. to 212° F.; the total duration of said temperatures not exceeding one hour; followed by a separating out of suspensions which are in the liquid after the heating step.

3. A process for making a hydrosol of Irish moss comprising the mixing of Irish moss in a body of water having at least twenty-five times the weight of the dry moss, and holding that body for a quarter hour at the temperature of boiling water and also for a quarter hour at a temperature which is within the range of 175° F. to 212° F.; the total duration of said temperatures not exceeding one hour; followed by separating the hydrosol thus made from structural fibre and other solids therein contained, by centrifugal action, by settling and by decanting.

4. A process for making a hydrosol of Irish moss, comprising the loosening of the protein and protoplasm which is in cured Irish moss, from other constituents of that moss, by cooking a body of that moss in a body of water of at least twenty-five times the dry weight of the moss, at a temperature whose optimum for the process is 212° F., for at least a quarter hour; reducing the temperature before the cooking extracts a major portion of any constituent of that moss which will gel on cooling, the optimum for duration of the cooking being under one hour; and centrifuging the mess, while it is at a temperature of at least 150° F., for separating a hydrosol of water with protein and protoplasm of the moss out from the said gel constituent and residuary solids of the original moss.

5. A hydrosol of Irish moss, comprising a dispersion in water of a colloid which results from the cooking and centrifugal separating of a 4% mixture of Irish moss in water; the said cooking being for an initial half hour in boiling water; and the said separating being centrifugal, at above 150° F., and being a dividing of the hydrosol from a residuum, in which the hydrosol comprises water, protoplasm and protein of the moss, and such other moss matter as has been sufficiently released, by the cooking, to separate itself centrifugally from the residuum; and the said residuum being structural fibre and whatever other matter remains with that fibre in the bowl of the centrifuge.

GORDON WEBSTER STOYLE.